United States Patent
Takeda (10) Patent No.: US 7,854,484 B2
(45) Date of Patent: Dec. 21, 2010

(54) TELEVISION RECEIVING SET

(75) Inventor: Kenichi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/149,787

(22) Filed: May 8, 2008

(65) Prior Publication Data

US 2008/0284290 A1    Nov. 20, 2008

(30) Foreign Application Priority Data

May 15, 2007    (JP)    ............... 2007-128746

(51) Int. Cl.
*A47B 81/06*    (2006.01)
(52) U.S. Cl. .................................... 312/7.2
(58) Field of Classification Search .............. 312/7.1, 312/7.2, 223.1, 223.2, 223.6, 257.1; 439/544; 24/701; 348/836, 839, 843
See application file for complete search history.

(56) References Cited

U.S. PATENT DOCUMENTS 2,938,188 A * 5/1960 Lazzery ................ 439/544
3,768,064 A * 10/1973 Pabich ................ 439/370

FOREIGN PATENT DOCUMENTS

| JP | 11-191683 | 7/1999 |
| JP | 3108609 U | 2/2005 |
| JP | 3109371 | 3/2005 |
| JP | 2005-293897 | 10/2005 |

* cited by examiner

*Primary Examiner*—James O Hansen
(74) *Attorney, Agent, or Firm*—Morgan Lewis & Bockius LLP (57) ABSTRACT

A recess made up of a rear bushing part receiving part and a front cord guiding part is formed as a space between a pair of rib walls opposed to each other in the left and right direction at a vicinity of an edge rim of a front cabinet on a side to be connected to a rear cabinet. First and second groove parts are formed on inner wall faces of the rib walls opposed to each other sandwiching the bushing part receiving part so as to engage respectively with the first and the second flange parts of the bushing part. The second groove part of the rib walls has no wall at the front side and is open to the cord guiding part.

1 Claim, 7 Drawing Sheets

TELEVISION RECEIVING SET

This application is based on Japanese Patent Application No. 2007-128746 filed on May 15, 2007, the contents of which are hereby incorporated by reference.

BACKGROUND OF THE INVENTION

1. Field of the Invention

The present invention relates to a television receiving set including a front cabinet having a recess for receiving a bushing part of a power cord.

2. Description of Related Art

Figure 7:
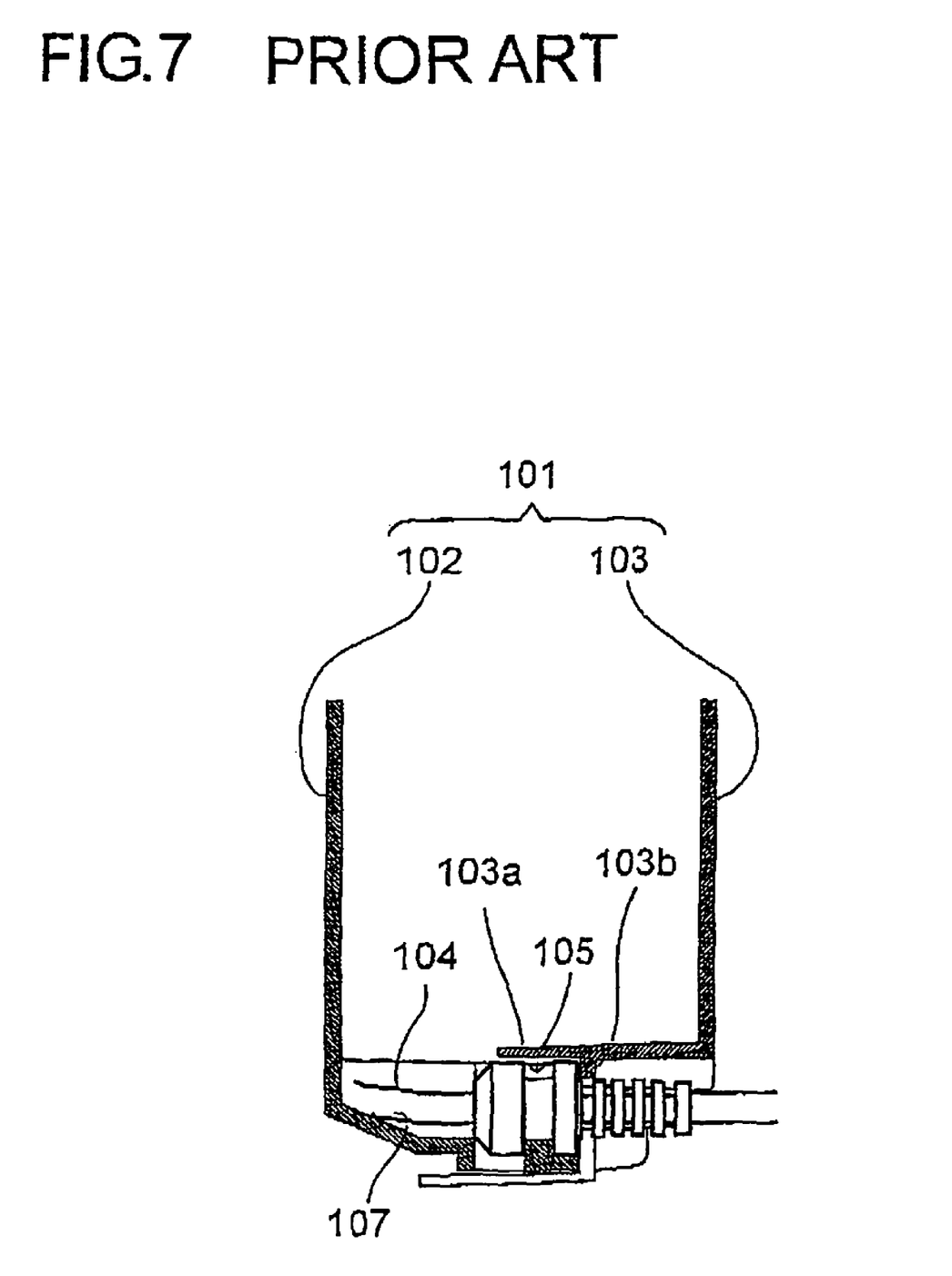
FIG. 7 is a cross section of a front cabinet and a rear cabinet of a conventional liquid crystal television receiving set showing a fixed state of a bushing part of a power cord, in which some parts are omitted.

FIG. 7 is a cross section of a front cabinet and a rear cabinet of a conventional liquid crystal television receiving set showing a fixed state of a bushing part of a power cord, in which some parts are omitted. As shown in FIG. 7, a cabinet 101 of the liquid crystal television receiving set includes a front cabinet 102 and a rear cabinet 103 that are combined with each other as a unit. A liquid crystal module and a main circuit board on which a driving circuit for driving the liquid crystal module and the like are formed (neither of them are shown) are attached to the front cabinet 102. Various types of components constituting the driving circuit, a tuner and the like are mounted on the main circuit board, and an end of a power cord 104 for supplying electrical power from the commercial AC line.

Figure 8:
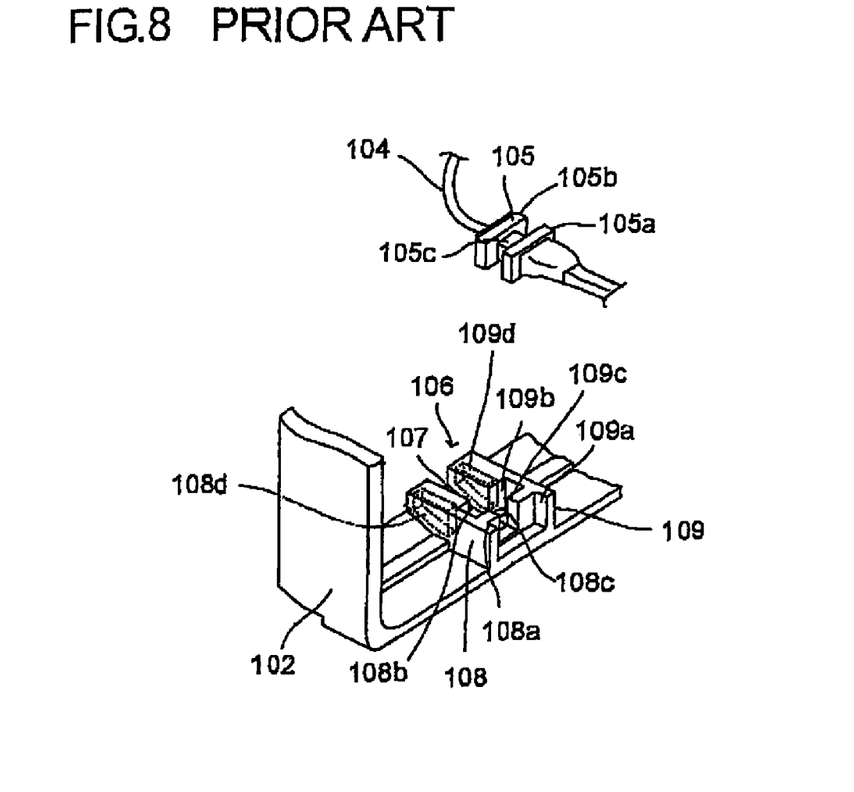
FIG. 8 is a perspective view showing a recess for receiving the bushing part of the power cord and its vicinity in the front cabinet of the conventional liquid crystal television receiving set.

FIG. 8 is a perspective view showing the recess for receiving the bushing part of the power cord and its vicinity in the front cabinet of the conventional liquid crystal television receiving set. As shown in FIG. 8, the power cord 104 has a bushing part 105 at a predetermined position for preventing the power cord 104 from dropping out from the cabinet. The bushing part 105 has a structure including first and second flange parts 105a and 105b of a rectangular solid shape opposed in parallel to each other with a predetermined space and a prism-like barrel part 105c connecting the flange parts 105a and 105b. Here, the first flange part 105a is on a position that is nearer to the free end of the power cord 104 (the end with a plug that is connected an AC inlet) than a position of the second flange part 105b.

Figure 9:
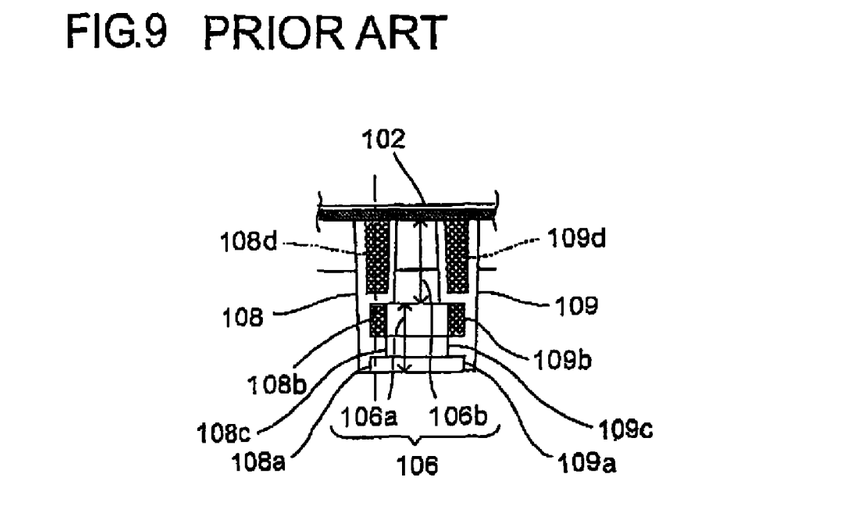
FIG. 9 is a plan view of the recess and its vicinity of the front cabinet of the conventional liquid crystal television receiving set viewed from the above.

The front cabinet 102 is provided with a recess 106 for receiving the bushing part 105 of the power cord 104, which is formed at a vicinity of its edge rim on the side to be connected to the rear cabinet 103. The recess 106 is formed in the space between a pair of rib walls 108 and 109 that are opposed to each other in the left and right direction as shown in FIG. 8. The recess 106 is made up of a bushing part receiving part 106a at rear and a cord guiding part 106b at front as shown in FIG. 9. A gradient part 107 that becomes higher as being closer to the front is formed on the bottom surface of the cord guiding part 106b.

The inner wall faces of the parts of the pair of rib walls 108 and 109 that are opposed to each other sandwiching the bushing part receiving part 106a have first groove parts 108a and 109a and second groove parts 108b and 109b to which the first and the second flange parts 105a and 105b of the bushing part 105 engages respectively. The protruding parts 108c and 109c that are formed between the first and the second groove parts are adapted to engage the outer face of the barrel part 105c of the bushing part 105.

Here, the first groove parts 108a and 109a are formed on the rear ends of the rib walls 108 and 109. Therefore, the first groove parts 108a and 109a have no wall at the rear side and are open to a space behind the front cabinet 102.

In contrast, the second groove parts 108b and 109b have a wall not only on the rear side but also on the front side.

Therefore, the rib walls 108 and 109 have steps between the wall surface facing the bushing part receiving part 106a and the wall surface facing the cord guiding part 106b.

For this reason, a thickness of the pair of rib walls 108 and 109 becomes larger at the parts opposed to each other via the cord guiding part 106b than the parts opposed to each other via the bushing part receiving part 106a, so that the part having larger thickness is apt to cause an uneven flow of resin upon molding of the rib walls 108 and 109. Therefore, hollow parts 108a and 109a opening to the outer side of the bottom wall of the rear cabinet 103 are formed so that the thickness of the resin at the part described above becomes as thin as the parts that are opposed to each other sandwiching the bushing part receiving part 106a.

The bushing part 105 of the power cord 104 is put in the recess 106 from the above as shown in FIG. 8 so as to be positioned in the left and right direction. After that, the rear cabinet 103 is combined with the front cabinet 102, so that the power cord 104 is positioned in the vertical direction and in the front and rear direction by a presser support 103a and a drop protection rib 103b formed in the rear cabinet 103 as shown in FIG. 7. Thus, the bushing part 105 is fixed to the cabinet.

Figure 10:
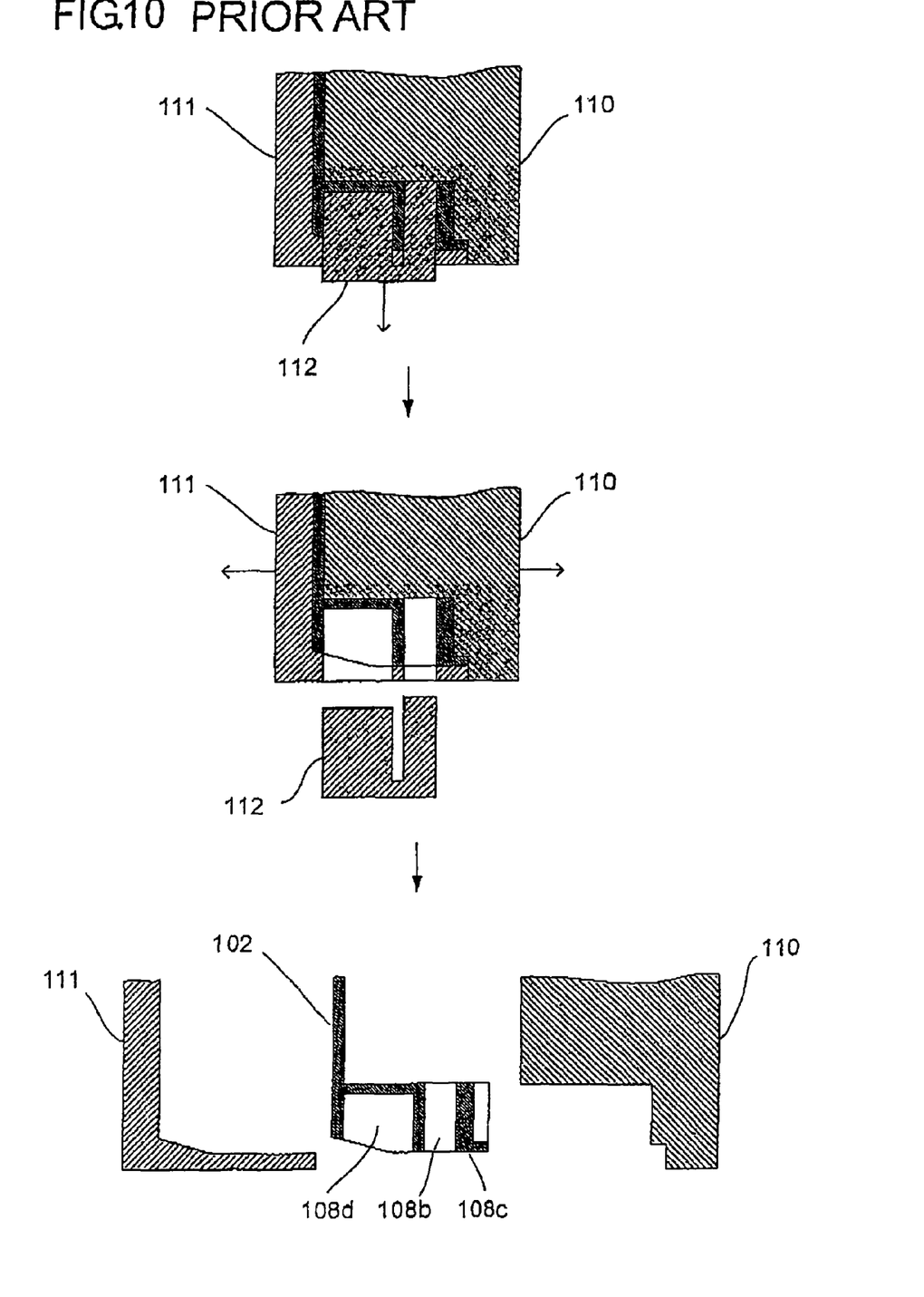
FIG. 10 is a cross section of the front cabinet of the conventional liquid crystal television receiving set cut along the dashed dotted line in FIG. 9, which shows steps of molding the front cabinet with some parts being omitted.

FIG. 9 is a plan view of the recess and its vicinity of the front cabinet of the conventional liquid crystal television receiving set viewed from the above. FIG. 10 is a cross section of the front cabinet of the conventional liquid crystal television receiving set cut along the dashed dotted line in FIG. 9, in which some parts are omitted and steps of molding the front cabinet are shown.

As shown in FIG. 10, the front cabinet 102 is formed by so-called injection molding, in which melted resin is injected into a mold consisting of a male mold 110 and a female mold 111. As shown in FIG. 9 with cross hatching, the second groove parts 108b and 109b and the hollow parts 108d and 109d becomes so-called undercut parts for which the mold cannot be separated when the molded item is taken out from the mold. Therefore, it is necessary to perform an undercut process of moving a part of the mold corresponding to the undercut part so that the mold can be separated. Conventionally, a slide core 112 is attached to the female mold 111 as shown in FIG. 10, and the slide core 112 is pulled downward by hand to remove the same before the molded item is taken out.

Therefore, the hollow parts 108d and 109d look like holes at the bottom part of the front cabinet 102 when the cabinet 101 of a television receiving set is viewed from the front, which causes a problem of bad appearance. In addition, there is a problem that a size of the mold increases.

Furthermore, Japanese Utility Model Registration No. 3108609 describes about an improvement of a mold for a front cabinet of a display device of a liquid crystal television receiving set or the like. However, it does not disclose anything about a method for forming a recess that receives a bushing part of a power cord.

SUMMARY OF THE INVENTION

It is an object of the present invention to provide a liquid crystal television receiving set that has good appearance without an apparent hole on the bottom of the front cabinet when it is viewed from the front side.

A television receiving set according to an embodiment of the present invention includes a front cabinet made of resin, a rear cabinet made of resin constituting a cabinet of a television receiver together with the front cabinet, a power cord extending from the inside to the outside of the cabinet, the power cord including a bushing part at a predetermined position, the bushing part disposed at a predetermined position of the power cord, the bushing part having a structure including first and second flange parts of a rectangular solid shape opposed in parallel to each other with a space and a prism-like barrel part connecting the flange parts, a recess formed at a vicinity of an edge rim of the front cabinet on the side to be connected to the rear cabinet, the recess formed as a space between a pair of rib walls opposed to each other in the left and right direction including a bushing part receiving part at rear and a cord guiding part at front, and first and second groove parts formed on inner wall faces of the pair of rib walls opposed to each other sandwiching the bushing part receiving part so as to engage respectively with the first and the second flange parts of the bushing part. The first flange part of the bushing part is closer to a free end of the power cord than the second flange part, the first groove part of the pair of rib walls has no wall at the rear side and is open to a space behind the front cabinet, and the second groove part of the pair of rib walls has no wall at the front side and is open to the cord guiding part.

Since the second groove part of the pair of rib walls has no wall at the front side and is open to the cord guiding part in the liquid crystal television receiver of the present invention, a part having a large area of the recess including the cord guiding part and the second groove part can be set as an undercut part when the front cabinet is molded. Therefore, the undercut process can be performed easily by attaching a slide core to the male mold and by moving the slide core upward so as to remove the same manually or automatically before the molded item is taken out, or by providing the female mold with a protrusion having a shape corresponding to the undercut part and by pulling the female mold to the front so as to remove the same before the molded item is taken out. As a result, it is possible to provide a liquid crystal television receiving set that has good appearance without an apparent hole on the bottom of the front cabinet when it is viewed from the front side.

DETAILED DESCRIPTION OF THE PREFERRED EMBODIMENTS

Hereinafter, a best embodiment of the present invention will be described with reference to the attached drawings. In the present invention, a television receiving set includes a front cabinet (102 in FIG. 7) made of resin, a rear cabinet (103 in FIG. 7) made of resin constituting a cabinet (101 in FIG. 7) together with the front cabinet 102, and a power cord (104 in FIGS. 7 and 8) extending from the inside to the outside of the cabinet 101. The power cord 104 includes a bushing part (105 in FIGS. 7 and 8) at a predetermined position. The bushing part 105 is disposed at a predetermined position of the power cord 104. Also, the bushing part 105 is structured to include first and second flange parts (105a and 105b in FIG. 8) of a rectangular solid shape opposed in parallel to each other with a space and a prism-like barrel part (105c in FIG. 8) connecting the flange parts 105a and 105b. The present invention is characterized in a shape of a recess formed in the front cabinet 102 for receiving the bushing part 105 of the power cord 104. The same parts as those of the conventional liquid crystal television receiving set shown in FIGS. 7 to 10 will be denoted by the same reference numerals, and detailed descriptions thereof will be omitted.

First Embodiment

Figure 1:
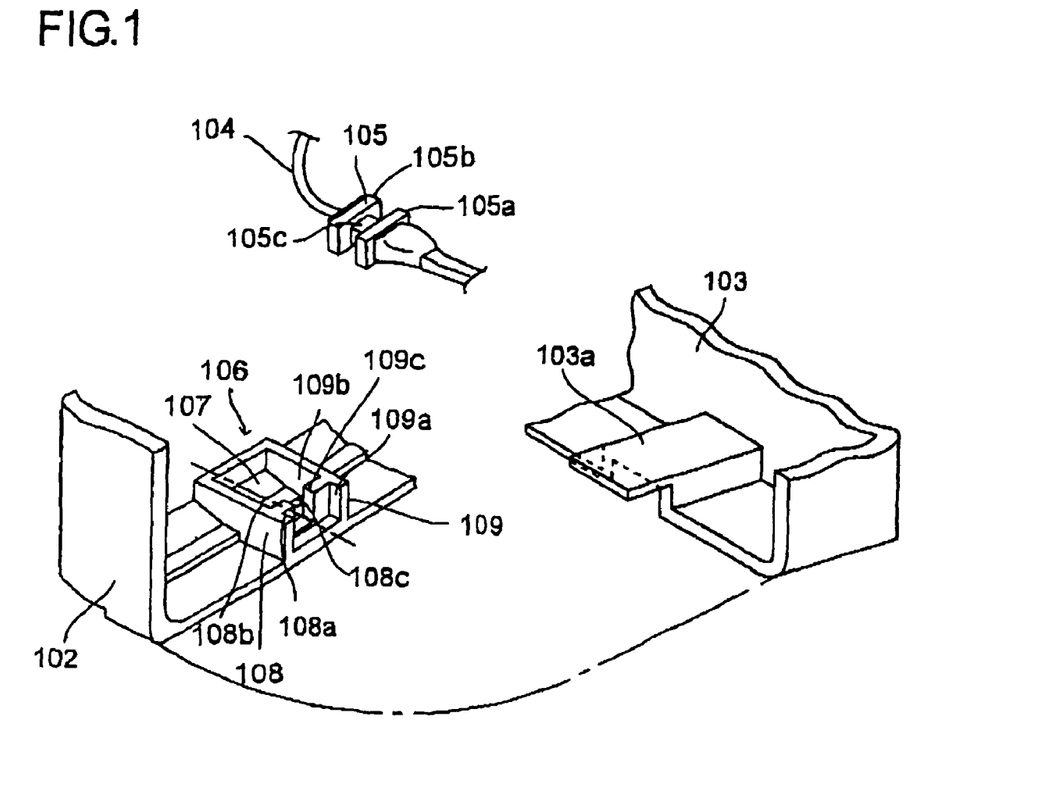
FIG. 1 is a perspective view showing a recess for receiving the bushing part of the power cord and its vicinity in the front cabinet of a liquid crystal television receiving set according to a first embodiment of the present invention.

FIG. 1 is a perspective view showing a recess for receiving the bushing part of the power cord and its vicinity in the front cabinet of a liquid crystal television receiving set according to a first embodiment of the present invention.

Comparing with the rib walls 108 and 109 (see FIG. 8) of the recess 106 in the conventional structure described above, the second groove parts 108b and 109b of the first embodiment have no wall on the front face side and have a shape opening to the cord guiding part 106b. In other words, the rib walls 108 and 109 have a uniform level without a step between the walls that are opposed to each other sandwiching the cord guiding part 106b and the walls at which the second groove parts 108b and 109b are formed.

Therefore, parts of a pair of rib walls 108 and 109, which are opposed to each other sandwiching the cord guiding part 106b, can have smaller thickness than the conventional structure (see FIG. 8). For this reason, the hollow parts 108d and 109d formed in the rib walls 108 and 109 in the conventional structure are unnecessary in the present embodiment.

Figure 2:
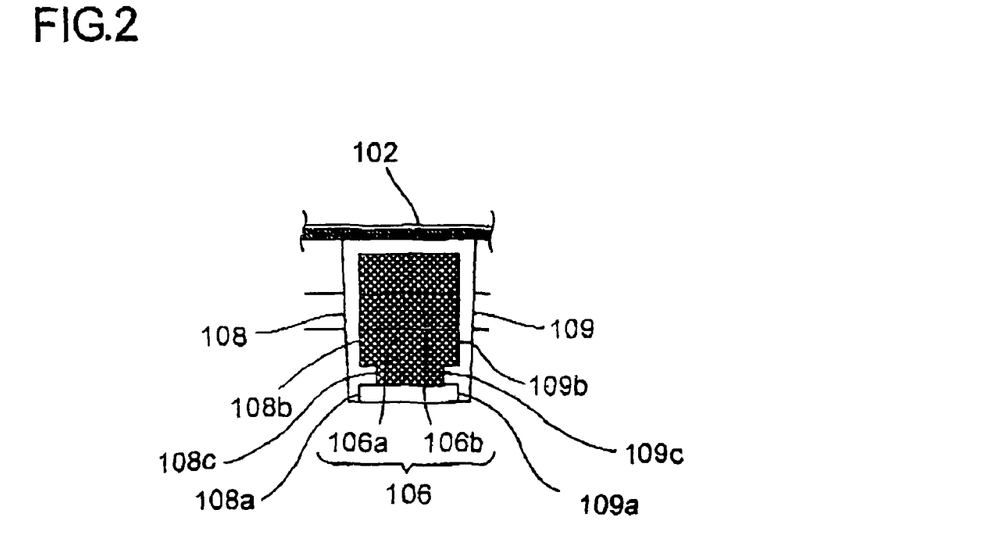
FIG. 2 is a plan view of the recess and its vicinity of the front cabinet of the liquid crystal television receiving set according to the first embodiment viewed from the above.
Figure 3:
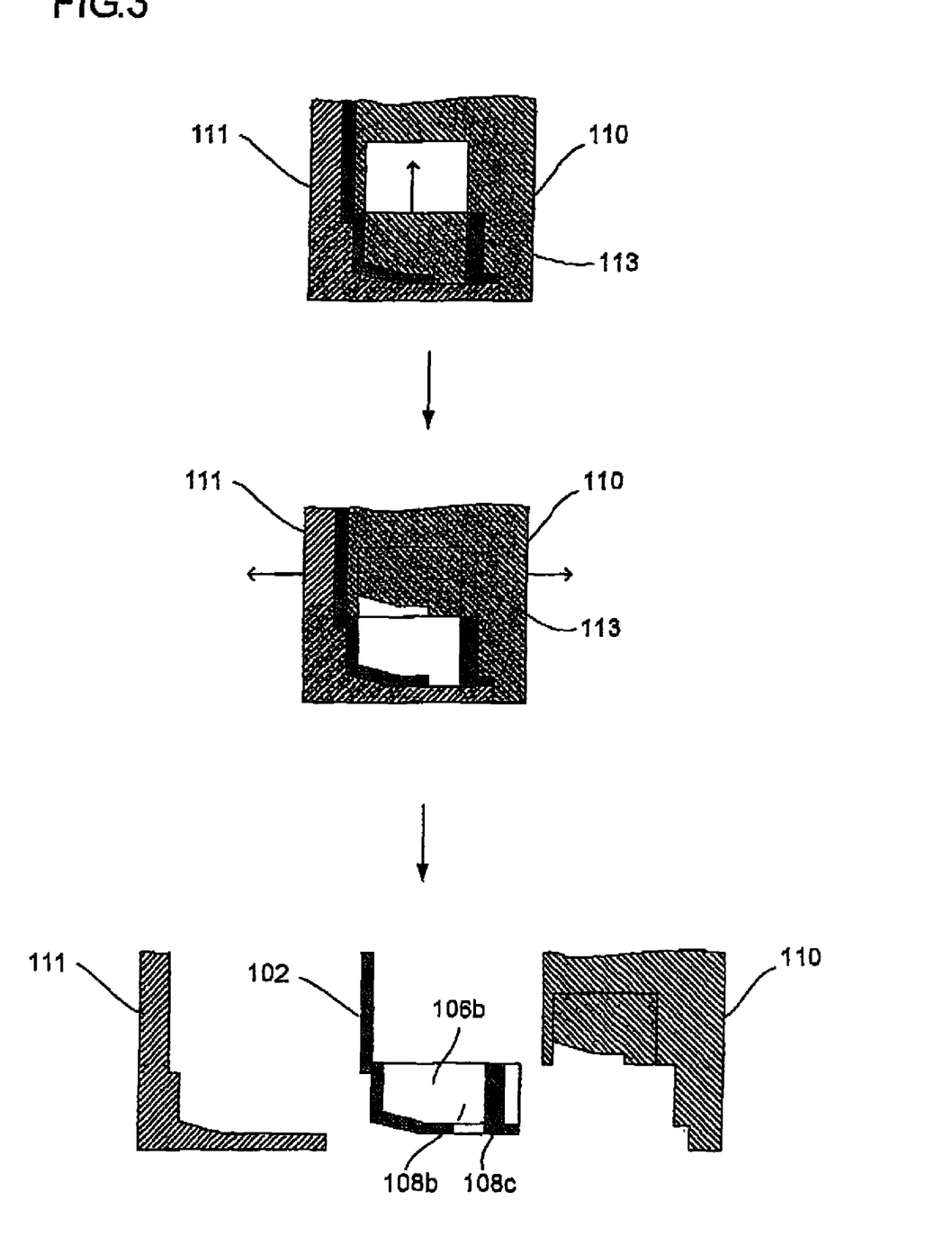
FIG. 3 is a cross section of the front cabinet of the liquid crystal television receiving set according to the first embodiment cut along the dashed dotted line in FIG. 1, which shows steps of molding the front cabinet with some parts being omitted.

FIG. 2 is a plan view of the recess and its vicinity of the front cabinet of the liquid crystal television receiving set according to the first embodiment viewed from the above. FIG. 3 is a cross section of the front cabinet of the liquid crystal television receiving set according to the first embodiment cut along the dashed dotted line in FIG. 1, which shows steps of molding the front cabinet with some parts being omitted.

Since the rib walls 108 and 109 have the shape as described above as to the first embodiment, a part having a large area of the recess 106 including the cord guiding part 106b and the second groove parts 108b and 109b can be set as an undercut part as shown in FIG. 2 with cross hatching when the front cabinet is molded. Therefore, the undercut process can be performed easily by attaching a slide core 113 to the male mold 110 and by moving the slide core 113 upward so as to remove the same manually or automatically before the molded item is taken out as shown in FIG. 3.

As a result, it is possible to provide a liquid crystal television receiving set that has good appearance without an apparent hole on the bottom of the front cabinet when it is viewed from the front side.

Second Embodiment

Figure 4:
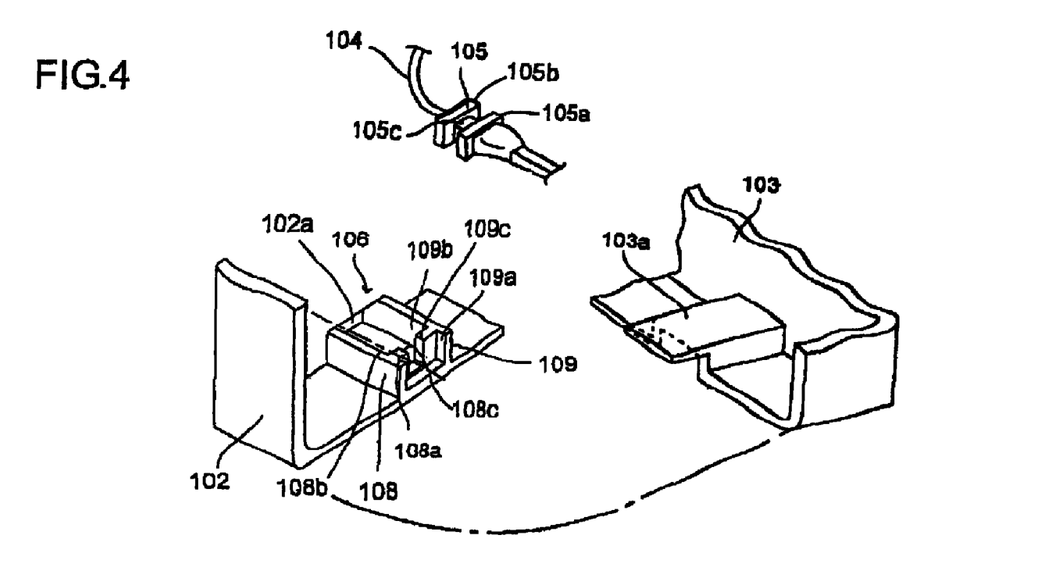
FIG. 4 is a perspective view showing a recess for receiving the bushing part of the power cord and its vicinity in the front cabinet of a liquid crystal television receiving set according to a second embodiment of the present invention.
Figure 5:
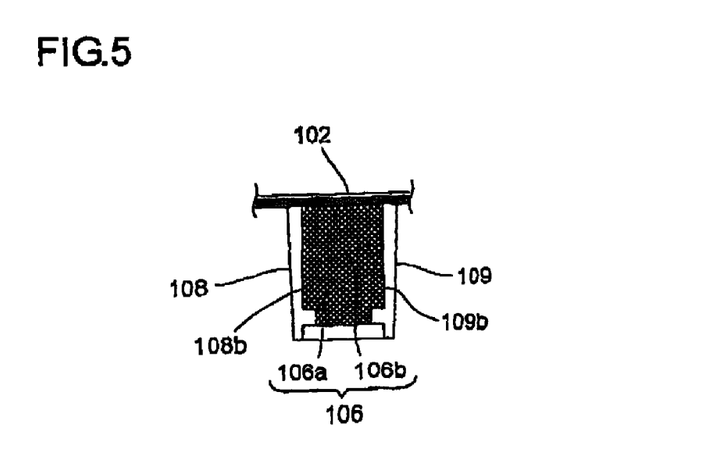
FIG. 5 is a plan view of the recess and its vicinity of the front cabinet of the liquid crystal television receiving set according to the second embodiment viewed from the above.
Figure 6:
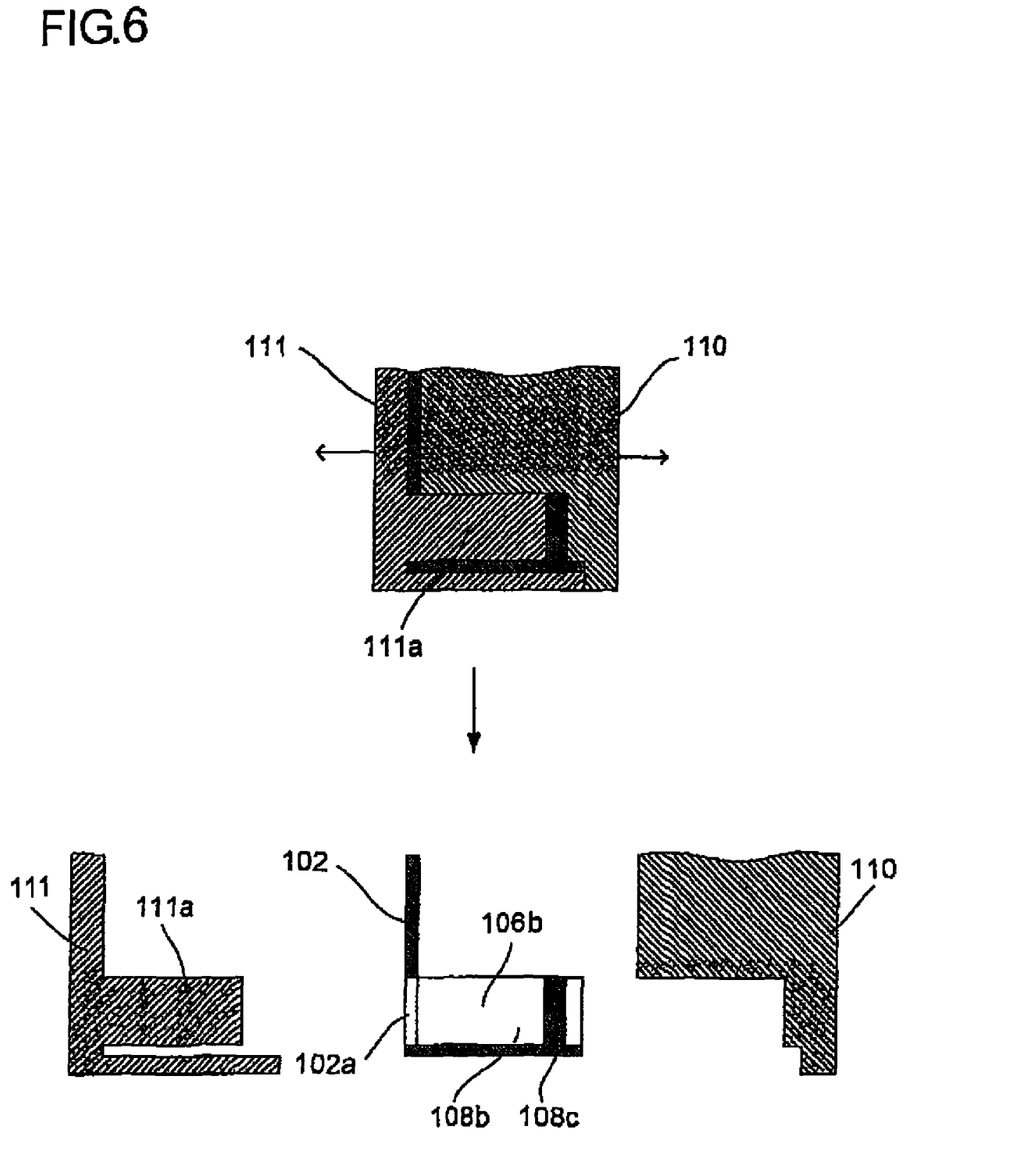
FIG. 6 is a cross section of the front cabinet of the liquid crystal television receiving set according to the second embodiment cut along the dashed dotted line in FIG. 4, which shows steps of molding the front cabinet with some parts being omitted.

FIG. 4 is a perspective view showing a recess for receiving the bushing part of the power cord and its vicinity in the front cabinet of a liquid crystal television receiving set according to a second embodiment of the present invention. FIG. 5 is a plan view of the recess and its vicinity of the front cabinet of the liquid crystal television receiving set according to the second embodiment viewed from the above. FIG. 6 is a cross section of the front cabinet of the liquid crystal television receiving set according to the second embodiment cut along the dashed dotted line in FIG. 4, which shows steps of molding the front cabinet with some parts being omitted.

As to the second embodiment, the second groove parts 108b and 109b of the rib walls 108 and 109 have no wall on the front face side and have a shape opening to the cord guiding part 106b in the same manner as the first embodiment. In addition, the bottom surface of the cord guiding part 106b is formed as a flat surface without the gradient part. Therefore, the undercut process can be performed easily by providing the female mold 111 with a protrusion 111a having a shape corresponding to the undercut part (the part shown in FIG. 5 with cross hatching) and by pulling the female mold to the front so as to remove the same before the molded item is taken out as shown in FIG. 6.

As a result, it is possible to provide a liquid crystal television receiving set that has good appearance without an apparent hole on the bottom of the front cabinet when it is viewed from the front side. Note that an opening 102a that is formed on the front surface of the front cabinet after the protrusion is removed can be covered with a label or the like.

The present invention can be used for any television receiving set including a CRT television receiving set, a liquid crystal television receiving set and a plasma television receiving set.

What is claimed is:

1. A television receiving set comprising:
    a front cabinet made of resin, the front cabinet including an integrally formed flat bottom part that is free of holes and a pair of rib walls opposed to each other in the left and right direction;
    a rear cabinet made of resin constituting a cabinet of a television receiver together with the front cabinet;
    a power cord extending from the inside to the outside of the cabinet, the power cord including a bushing part at a predetermined position;
    the busing part disposed at a predetermined position of the power cord, the bushing part having a structure including first and second flange parts of a rectangular solid shape opposed in parallel to each other with a space and a prism-like barrel part connecting the flange parts; and
    a recess formed at a vicinity of an edge rim of the front cabinet on the side to be connected to the rear cabinet, the recess formed as a space between a continuous flat surface on each rib wall and defining a bushing part receiving part at rear and a cord guiding part at front; wherein
    the bushing part receiving part and the cord guiding part communicate with each other without a step for the reduction of the width of the cord guiding part.

* * * * *